Nov. 1, 1966  W. C. WEHNER  3,282,121
DRIVE CHAIN

Filed March 24, 1964  2 Sheets-Sheet 1

INVENTOR.
WILLIAM C. WEHNER
BY
Burton & Parker
ATTORNEYS

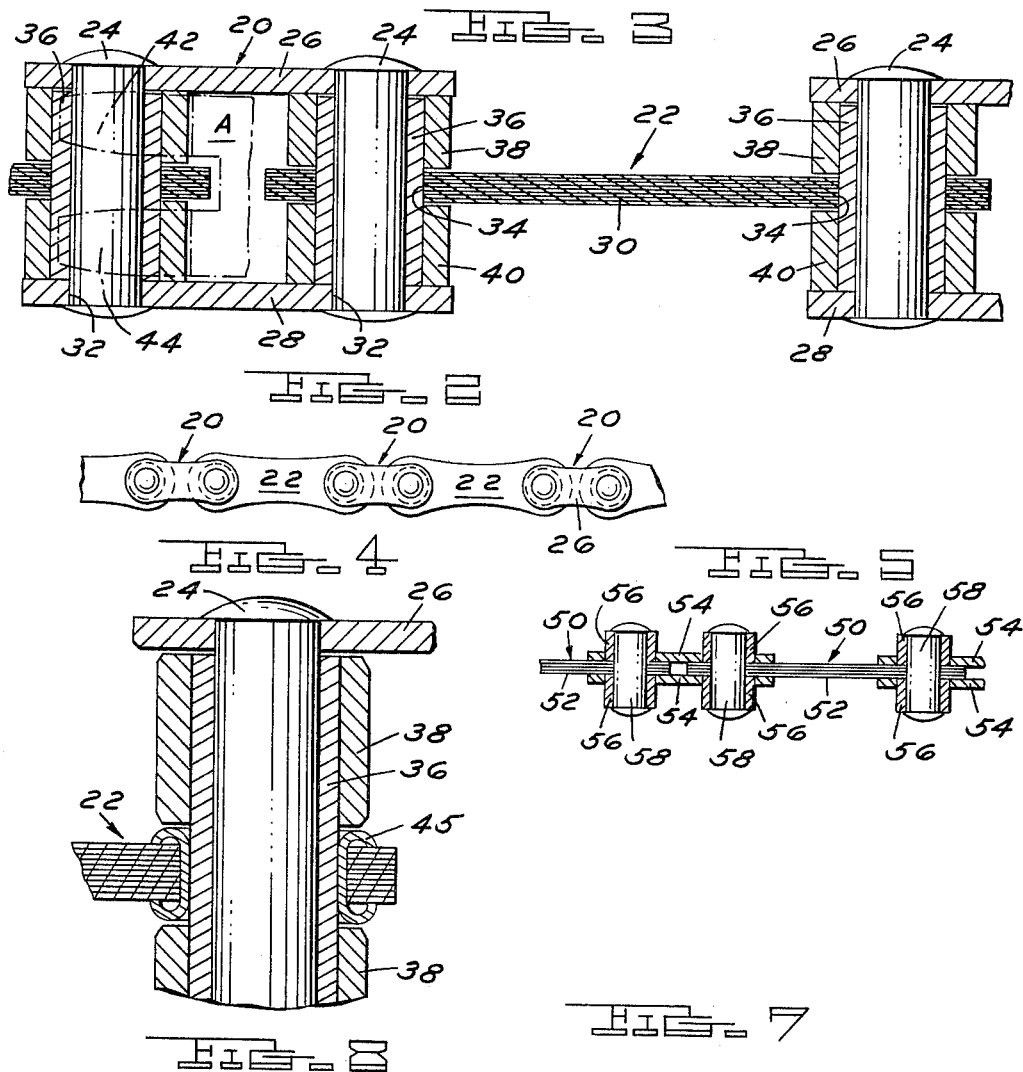
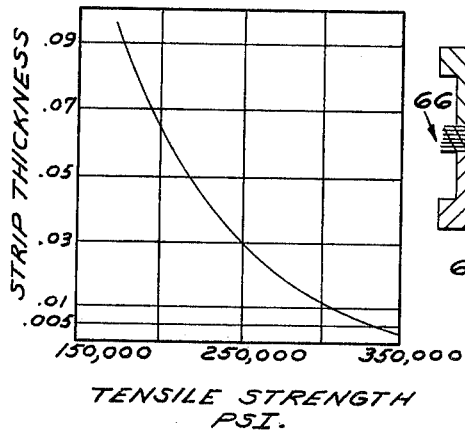

United States Patent Office 3,282,121
Patented Nov. 1, 1966

3,282,121
DRIVE CHAIN
William C. Wehner, Detroit, Mich., assignor to Moog Industries, Inc., St. Louis, Mo., a corporation of Missouri
Filed Mar. 24, 1964, Ser. No. 354,246
6 Claims. (Cl. 74—245)

This invention relates to chain and sprocket drives, and in particular to a drive chain capable of being entrained around two or more sprockets whose axes lie in different planes.

Chain drives have been utilized to transmit power for many years, and are hence well known. Conventional drive chain comprises a series of rigid link members each having two spaced side bars held in spaced relation and pivotally joined to adjacent links by cylindrical pins. Such chain has found wide acceptance in applications where the driving and driven sprockets can all be positioned in a common plane. However, in many instances, the drive shafts of the machines or the like are not disposed so as to make use of a simple chain-sprocket drive. In these cases various systems have been incorporated with the chain drive to achieve a workable arrangement. Gearing has been used extensively to transmit power between drives where the shafts to be rotated are angularly related. In addition, some attempts have been made to provide a twistable drive chain, but these attempts have met with little commercial success.

It is therefore the general object of the invention to provide a drive chain having power transmission characteristics at least equal to conventional roller chain, which chain is capable of driving a plurality of sprockets lying in diverse planes, and which chain is also of a simple, commercially acceptable construction.

Another object of the invention is the provision of a drive chain of the above character which is lighter in weight and at the same time stronger, than conventional roller chain presently available.

A further object is the provision of a novel link for use in drive chain which link includes a plurality of thin laminae of flexible, twistable material such as spring steel or the like arranged in a laminated pack to form a link which is torsionally deflectable about its longitudinal axis, and which link is provided with transverse apertures adjacent its opposite ends for accommodation of cylindrical pins coupling the link to adjacent rigid chain links.

Another object is the provision of a drive chain for high torque and power transmission comprising alternate rigid links and flexible links, the rigid links being the sprocket-engaging members and having inflexible side plates and the flexible links including thin laminae arranged in congruent face-to-face abutting relation to form a trosionally deflectable link, with both the rigid and flexible links having apertures adjacent their opposite ends and pins extending through the aperture interconnecting the links to from a length of chain.

Other objects, advantages and meritorious features will more fully appear from the following specification, claims and accompanying drawings, werein:

FIG. 4 is an enlarged partial section through the drive chain showing a preferred construction of the flex link for easier assembly and better wear properties;

FIG. 5 is a longitudinal section showing a modified form of drive chain embodying the invention;

FIG. 6 is a schematic perspective showing a continuous length of drive chain entrained over a series of sprockets having axes disposed in different planes;

FIG. 7 is a longitudinal section showing another modified form of drive chain embodying the invention;

FIG. 8 is a graph showing the relationship between strip thickness and allowable tensile stress for spring steel; and FIG. 9 is a graphic representation of a thin strip of spring steel subjected to torsional forces twisting the strip about its longitudinal centerline.

Figure 1:
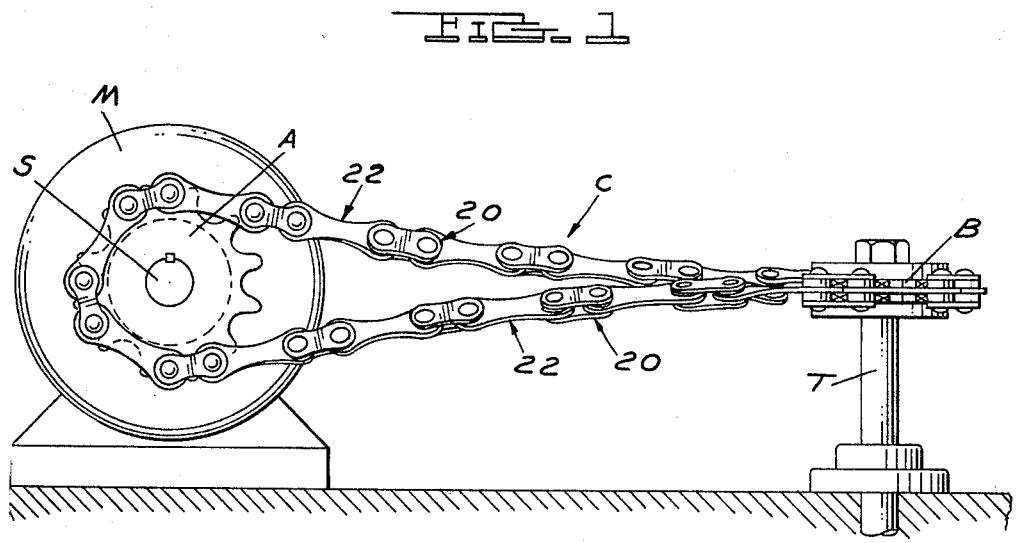
FIG. 1 is an elevation of a typical chain drive between two sprockets disposed perpendicular to each other showing a chain embodying the invention in driving connection with the sprockets.

There is illustrated in FIG. 1 a drive chain C embodying the invention drivingly entrained over two drive sprockets A and B whose axes are disposed substantially perpendicular to each other. A motor M or the like drives sprocket A through shaft S to which sprocket A is keyed, and the chain transmits power to sprocket B supported on shaft T. The sprockets are of conventional type having external teeth which engage the chain links, and in the embodiments shown the sprockets are double, that is, each has two spaced parallel rows of teeth. Of course two single sprockets could be provided fixed on a common shaft instead of one double sprocket. In FIG. 6 there is schematically illustrated a chain C of the character herein disclosed drivingly of connected to four sprockets indicated at D, E, F and G to transmit power from one source to a plurality of driven members, in this case three. To be capable of establishing driving connections such as shown in FIGS. 1 and 6, the drive chain C must possess certain characteristics not enjoyed by conventional chain.

Figure 2:
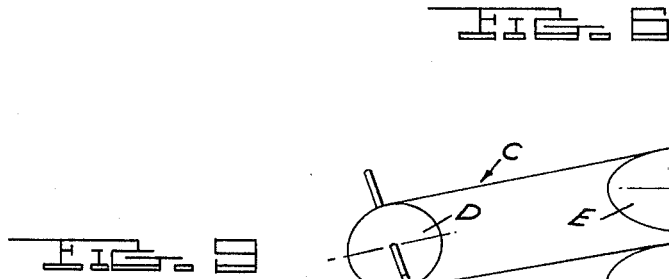
FIG. 2 is a side elevation of a length of the chain shown in FIG. 1 in relaxed condition.
Figure 3:
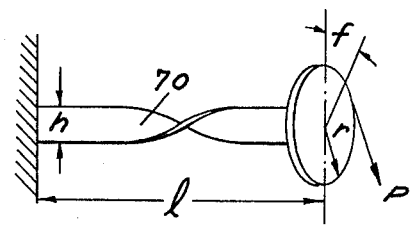
FIG. 3 is an enlarged longitudinal section of the drive chain of FIGS. 1 and 2.

Referring now to FIGS. 2 and 3, there is shown more particularly the component parts which make up the chain C. These include alternate rigid links 20, flexible or twistable links 22 (sometimes referred to herein as flex links), and connecting pins 24. Each of the rigid links 20 has spaced parallel side bars or plates 26 and 28, while each flex link 22 comprises a plurality of thin strips or laminae 30 of spring steel or the like. Each side bar 26 has apertures 32 adjacent opposite ends thereof sized to accommodate the pins 24 in press fit. The flex links such as 22 are apertured adjacent opposite ends as at 34 to receive in press fit a bushing 36, which bushing is slidably receivable over pin 24 so as to be rotatable with respect thereto. With the pins 24 press fitted into the side bars 26 and the bushings 36 press fitted into the flex link 22, the bars 26 are held in spaced-apart relation and the assembly of the bushings 36 and flex link 22 is freely rotatable on the pin. Cylindrical rollers 38 and 40 are rotatably supported on the bushing 36 on opposite sides of the flex link 22. As shown in phantom in FIG. 3, the double sprocket A has two rows of spaced teeth as shown at 42 and 44 which project between and engage adjacent sets of rollers to drive the chain. The sprocket and chain dimensions are such that the sprocket will never contact the laminations of the flex link, for as shown in FIG. 3 the sprocket A is guided between side bars 26 and in the event of slight misalignment or slack in the chain C the sprocket will engage the side bars on either side without touching the end of the flex link.

As with conventional chain, the chain pitch is equal to the distance between the centerlines of adjacent pins. In the illustrated embodiment, the distance between pins 24 along the rigid link 20 is the chain pitch, while the distance along the flex 22 is equal to twice the pitch. This construction insures adequate flexing and permissible twisting of the chain while retaining the strength characteristics of conventional chain.

FIG. 4 illustrates a sleeve or grommet 45 lining the aperture in the laminated flex link 22. By the use of the grommet 45, the laminations making up the link may be assembled and the apertures 34 drilled adjacent opposite ends, and then the grommets may be inserted in the apertures and formed overlying the edges thereof as shown. This provides a separate flex link subassembly which may be easily pressed onto the bushing 36 during assembly of a length of chain C. The links 22 with grommets 45 thereon press fitted over bushings 36 may be stocked, and then all that is necessary to assemble the chain is to slip the rollers 40 over the opposite ends of the bushings, insert the pins 24 and attach side plates 26.

As can be observed from the drawings, the chain C shown therein comprises fewer parts and therefore is lighter in weight than conventional chain. Most importantly, this reduction in weight has not been accompanied by any loss of chain strength. The graph of FIG. 8 shows the tensile strength of regular spring steel is plotted against the thickness of a strip, and it can be easily seen that the strength of a strip 0.005 thick is more than 100,000 p.s.i. greater than a strip $\frac{1}{16}$ inch thick (0.0625). Hence a flex link 22 comprising say ten strips or laminae each 0.006 thick would be appreciably stronger than a link comprising say two plates each $\frac{1}{16}$ inch thick. (Source: Associated Spring Corporation Material Specifications, February 1954.)

In FIG. 5 there is shown a slightly modified construction that may be advantageously used for smaller size chain. Such shows laminated flex links 50 each comprising a plurality of thin strips 52 essentially the same as link 22 previously described, and rigid links comprising spaced side bars 54 into which bushing members 56 are press fit assembled. The links are coupled together by the pins 58 which are press fitted into the aperture flex links 50 and are rotatably secured within the bushings 56. The rigid links are herein of single pitch length while the flex links are again each of double pitch length.

FIG. 7 shows a construction similar to FIG. 5 except that the rigid links each comprise a combined side bar-bushing member 60 rather than the separate parts 54 and 56. Members 60 may be cast instead of being machined members, and are provided with apertures 62 through which the pin 64 rotatably projects carrying the flex link 66. The pins 64 must be rotatable within the aperture 62 to permit the chain to be entrained about a cylindrical sprocket, but must also be retained against longitudinal movement with respect to the member 60. This may be accomplished by upsetting the metal of the pin at its opposite ends to hold the pin and link member together, as indicated by numeral 68.

In FIG. 9 there is shown a single shim or strip 70 used to form one of the flex links of the chain embodying the invention. This strip of spring steel is shown as twisted through a moment arm $r$ by a load P for a distance or angle $f$ measured in inches. For a $\frac{3}{8}$ inch pitch chain, the effective length of each flex link will be two times the chain pitch or 0.75 inch. Therefore length $L=0.75$ and we will assume a width ($h$) of 0.25 inch and a strip thickness ($b$) of 0.006 inch. The modulus of elasticity in torsional shear (G) under these conditions in equal to 12,000,000 p.s.i.

Assuming a maximum permissible stress (S) of 100,000 p.s.i., the deflection $f=0.8rLS(b^2+h^2)/bh^2G$ or $0.83r$, or 0.83 radian, which is equal to somewhat over 47 degrees. (Source: Marks' Mechanical Engineers' Handbook, Second edition 1924 pp. 441, 442.)

Simply stated, one of the thin lamina 0.75 inch long, 0.25 inch wide and 0.006 inch thick which is used to form a link for the chain embodying the invention can be twisted through an angle of approximately 47 degrees without damage. Therefore a pack of such strips placed face-to-face can be twisted through the same angle without damage. It can thus be seen from a glance at FIGS. 1–3 for example, that two of the flex links 22 would be capable of sufficient twisting to permit a perpendicular relationship between sprockets A and B, as each flex link can twist 47 degrees.

In practice it is generally desirable to place only a fraction of allowable stress on the chain, and, for example, if the sprockets A and B were placed apart a distance allowing nine links 22 therebetween, each link 22 need deflect only ten degrees, and the stress thereon would be only about $\frac{1}{5}$ of maximum, or 20,000 p.s.i.

What is claimed is:

1. A drive chain for driving engagement over sprockets lying in different planes comprising a succession of drive links connected together in end-to-end relation by single laminar torsional links, each drive link having drive bushing portions adjacent opposite ends thereof to provide drive surfaces for engaging sprocket teeth, each torsional link comprising a plurality of juxtaposed thin spring metal strips of a pitch length equal to at least twice the pitch length of said drive links and pivotally connected at opposite ends to said drive links in a plane substantially parallel to said drive links with said drive bushing portions projecting beyond opposite faces of each torsional link.

2. The invention as defined in claim 1 characterized in that each of said drive bushing portions of said drive links comprises a pin-like portion extending transversely of the plane of said torsional links and a roller portion surrounding said pin-like portion, and each of said torsional links is pivotally connected to one of said portions substantally midway between opposite ends thereof.

3. A drive chain for driving entrainment over sprockets lying in different planes comprising a succession of drive links interconnected together by single laminar torsional links, each drive link including longitudinally extending spaced apart parallel side portions and transversely extending drive bushing portions adjacent opposite ends of said side portions, each torsional link including a plurality of juxtaposed thin metal strips of a pitch length equal to at least twice the pitch length of said drive links and pivotally connected at opposite ends to said drive links in a plane substantially parallel to said drive links, with said drive bushing portions on said drive links projecting laterally beyond opposite faces of said torsional links to provide drive surfaces for engaging sprocket teeth.

4. The invention as defined in claim 3 characterized in that each of said drive links which includes longitudinally extending spaced parallel side portions of rigid construction and said transversely extending drive bushing portions are connected to said side portions adjacent opposite ends of the latter.

5. The invention as defined in claim 4 characterized in that each of said drive bushing portions of said drive links includes a pair of cylindrical sleeve roller portions disposed on opposite sides of the laminar torsional link preventing lateral shiftable movement of said torsional link with respect to the plane of said torsional links.

6. The invention as defined in claim 3 characterized in that each of said laminar torsional links is provided with apertures adjacent opposite ends thereof, with a grommet projecting through each aperture and overlying opposite lateral side faces of the link to secure the laminae in face-to-face abutment, and said drive bushing portions of said rigid links projecting through said grommets.

(References on following page)

References Cited by the Examiner

UNITED STATES PATENTS

| | | | |
|---|---|---|---|
| 1,270,460 | 6/1918 | Taylor | 74—245 |
| 1,877,339 | 9/1932 | Kottlowski | 74—245 X |
| 2,062,115 | 11/1936 | Bendall | 74—245 |
| 2,158,622 | 5/1939 | Festenberg-Pakisch | 74—255 |
| 2,458,682 | 1/1949 | Couper | 74—245 |
| 2,831,360 | 4/1958 | Couper | 74—245 |
| 2,869,379 | 1/1959 | Welser | 74—245 |

FOREIGN PATENTS

| | | |
|---|---|---|
| 844,470 | 4/1939 | France. |
| 1,079,285 | 5/1954 | France. |
| 1,120,267 | 4/1956 | France. |
| 8,830 | 1887 | Great Britain. |

DAVID J. WILLIAMOWSKY, *Primary Examiner.*

DON A. WAITE, *Examiner.*

J. A. WONG, *Assistant Examiner.*